(12) United States Patent
Hetzler (10) Patent No.: US 7,702,922 B2
(45) Date of Patent: Apr. 20, 2010

(54) PHYSICAL ENCRYPTION KEY SYSTEM (75) Inventor: Christopher J Hetzler, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1129 days.

(21) Appl. No.: 10/919,599

(22) Filed: Aug. 17, 2004

(65) Prior Publication Data

US 2006/0041934 A1   Feb. 23, 2006

(51) Int. Cl.
G06F 12/14    (2006.01)
G06F 7/04     (2006.01)

(52) U.S. Cl. ............................. 713/193; 726/9; 726/27
(58) Field of Classification Search ................. 713/193; 726/9, 27
See application file for complete search history.

(56) References Cited

U.S. PATENT DOCUMENTS

| | | | | |
|---|---|---|---|---|
| 5,282,247 | A * | 1/1994 | McLean et al. | 711/164 |
| 5,623,637 | A * | 4/1997 | Jones et al. | 711/164 |
| 6,012,146 | A * | 1/2000 | Liebenow | 726/17 |
| 6,075,858 | A * | 6/2000 | Schwartzman | 705/52 |
| 6,148,402 | A * | 11/2000 | Campbell | 726/10 |
| 6,438,550 | B1 * | 8/2002 | Doyle et al. | 707/9 |
| 6,948,090 | B2 * | 9/2005 | King | 714/7 |
| 7,120,252 | B1 * | 10/2006 | Jones et al. | 380/201 |
| 7,269,258 | B2 * | 9/2007 | Ishihara et al. | 380/263 |
| 2003/0014636 | A1 * | 1/2003 | Ahlbrand | 713/176 |
| 2003/0163719 | A1 * | 8/2003 | Ebihara | 713/193 |
| 2003/0185398 | A1 * | 10/2003 | Hypponnen | 380/277 |
| 2003/0200450 | A1 * | 10/2003 | England et al. | 713/189 |
| 2004/0003267 | A1 * | 1/2004 | Strom et al. | 713/193 |
| 2004/0264698 | A1 * | 12/2004 | Oda | 380/269 |
| 2005/0027997 | A1 * | 2/2005 | Ueno et al. | 713/193 |
| 2005/0132369 | A1 * | 6/2005 | Kraenzel | 718/100 |
| 2007/0162954 | A1 * | 7/2007 | Pela | 726/2 |

OTHER PUBLICATIONS

Mischel, Jim, "Isolated Storage" informIT.com Oct. 24, 2003, pp. 1-7.*
Gunderloy, Mike "ONDotNet.com: Isolated Storage Basics," Apr. 21, 2003, pp. 1-7 <http://www.ondotnet.com/lpt/a/3385>.*

* cited by examiner

Primary Examiner—Michael Pyzocha
(74) Attorney, Agent, or Firm—Lee & Hayes, PLLC (57) ABSTRACT A physical encryption key system binds an encryption key to a physical key and denies decryption of secured information if the physical key is not present to a particular computing device. In one implementation, the physical key comprises a convenient removable pen drive on which a .NET isolated storage space is created to store the encryption key. The .NET isolated storage space can only be accessed by concurrence of the same user, domain, computing device, application, and physical key that participated in creating the isolated storage space. The user enjoys the security of knowing that protected information cannot be decrypted without the physical key; cannot be decrypted without the user's credentials even if the physical key is stolen; and cannot be decrypted if the protected information is pirated to a different computing device.

13 Claims, 6 Drawing Sheets

PHYSICAL ENCRYPTION KEY SYSTEM

TECHNICAL FIELD

The subject matter relates generally to computer security and more specifically to a physical encryption key system.

BACKGROUND

Security and privacy are becoming paramount issues in personal computing. It is now a common occurrence for security flaws to be uncovered in the bulletproof security of computing and Internet systems. This puts private and personal data at risk.

Several schemata are conventionally used to keep a user's files secure. Requiring a username and password for access to files and websites is now in widespread use. However, a typical user has many types of personal data files associated with many types of computing applications, each requiring a different password. Since it is unwise to use the same password for many different secured resources, the typical user ends up with a multitude of passwords—too many too remember. Thus, a user may record the many passwords, putting the resources they protect at risk if an unintended person finds the cache of passwords. Passwords can also be guessed, there are even legendary hackers known for this ability. Further, malicious background processes that read keystrokes as passwords are being entered by the user are relatively common.

Encryption per se is another technique for protecting private data resources. In a sense, encryption and password protection are very closely related. Often the only difference is that part of a password may contain a word familiar to the human, providing a human memory device, while an encryption key is often purely random, consisting of random numbers and symbols. Password protection is often a front-end for encryption, that is, the encryption key is often derived from a form of the input password. Guessing an encryption key can be automated, so that if the password or encryption key is too simple, then it is at risk.

One of the problems with security key infrastructures is that the "combination to the safe," i.e., private keys, must be stored somewhere. For most computing systems, but especially for typical end-users with limited resources, the storage place for security keys is usually on the same hardware that stores the personal data being protected. Although encryption algorithms can be very strong, even the a remote possibility that an encryption key could be discovered and exploited to open private information on the same machine as the key disturbs the security-minded user's peace of mind.

The more sensitive the private data, the greater looms the apprehension that someone with enough time could garnish resources to break into the private data. In other words, a feeling of perfect security is difficult to obtain when the user does not know the current state of decryption arts or the sophistication of deciphering tools available to hackers, government agencies, and manufacturers of the user's equipment and software.

Hardware security solutions have been tried, but these are usually either awkward or easily worked around. Removing the media that contains the sensitive information from the host computing device, for instance, can provide a greater vulnerability than the pitfalls of password and encryption schemes. Physical locks that lock out, e.g., the keyboard, are easily circumvented and are no longer even offered as options when purchasing a computer.

Hence, although there is always a need for stronger data security, there is especially a long felt need for a device or technique that provides a user with a higher degree of peace of mind—a feeling of certain security, wherein the user can know more absolutely that personal data is secure even if the private information is stored far away from the user and even if the computing device that stores the private information has been confiscated, stolen, or inadvertently given to charity.

SUMMARY

A physical encryption key system binds an encryption key to a physical key and denies decryption of secured information if the physical key is not present to a particular computing device. In one implementation, the physical key comprises a convenient removable pen drive on which a MICROSOFT® .NET FRAMEWORK isolated storage space is created to store the encryption key. The .NET isolated storage space can only be accessed by concurrence of the same user, domain, computing device, application, and physical key that participated in creating the isolated storage space. The user enjoys the security of knowing that protected information cannot be decrypted without the physical key; cannot be decrypted without the user's credentials even if the physical key is stolen; and cannot be decrypted if the protected information is pirated to a different computing device.

DETAILED DESCRIPTION

Overview

There is a need for computer users to not only be assured that their system is secure but to also feel confident in the security their system provides for protecting the private information that is stored there. Encryption of personal files has conventionally been a technique for achieving security but the location where the user should store an encryption key for accessing the encrypted files has always been problematic.

Figure 1A:
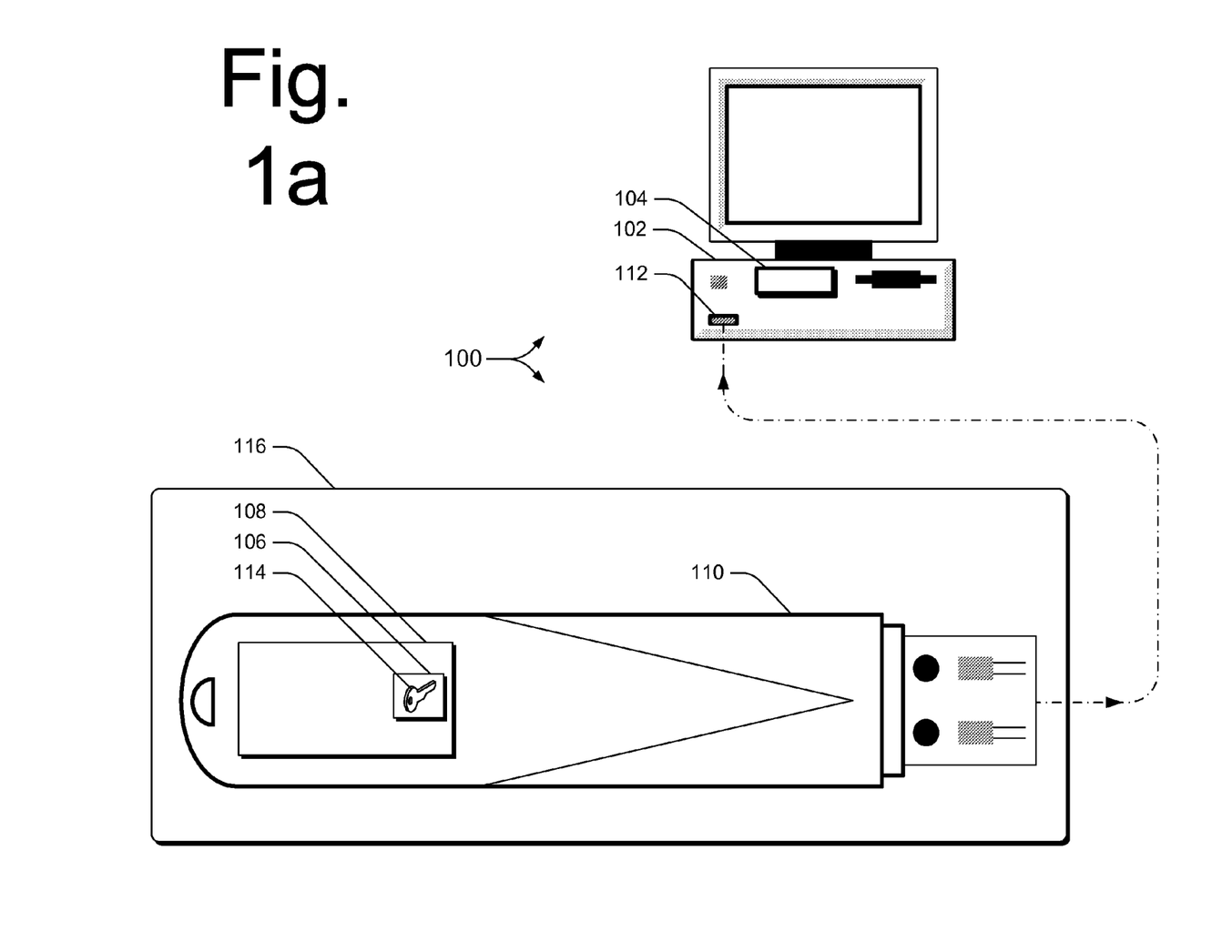
FIG. 1a is a block diagram of a first exemplary security system.
Figure 1B:
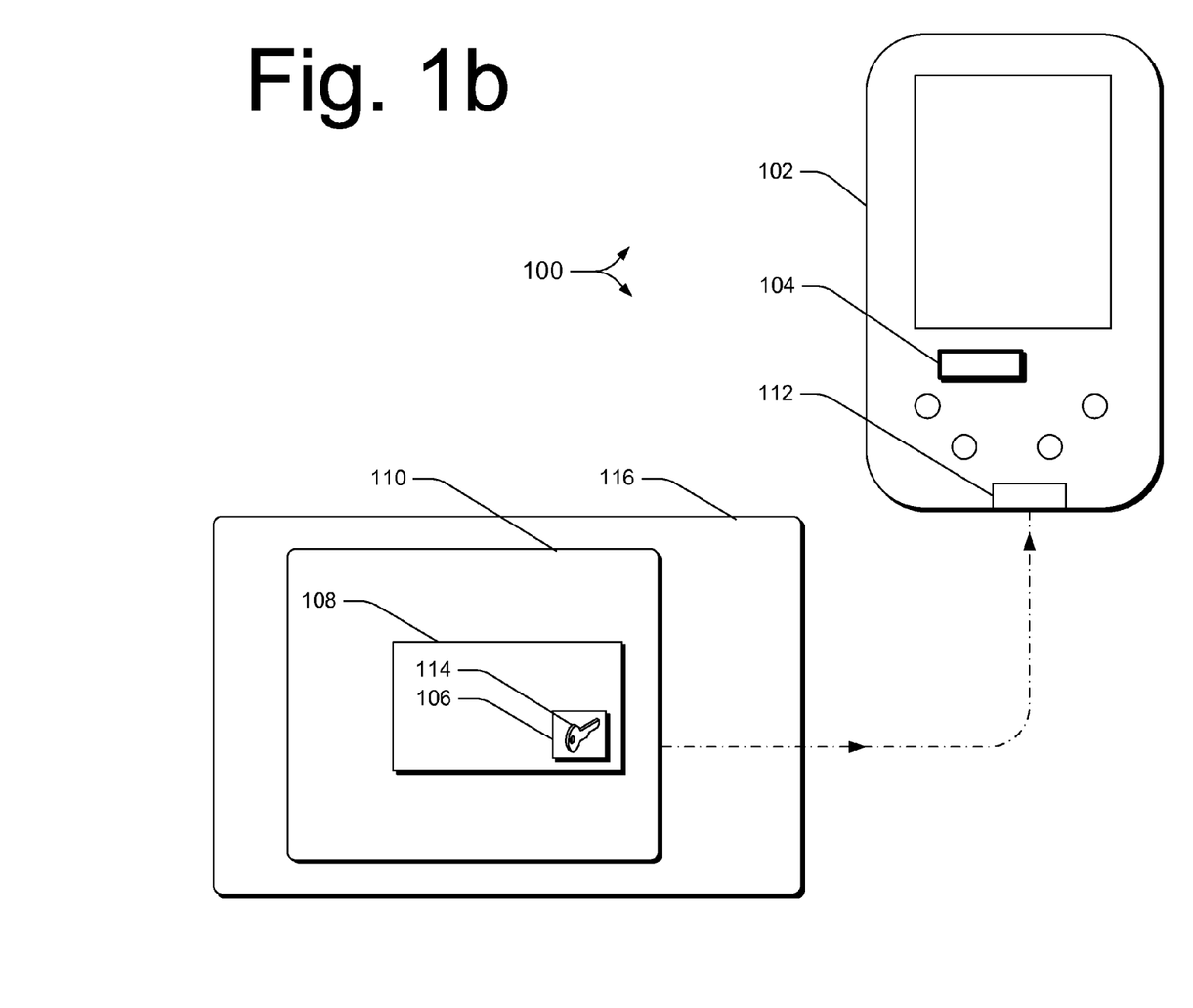
FIG. 1b is a block diagram of a second exemplary security system.

As shown in FIGS. 1a & 1b, exemplary physical encryption key systems 100 provide peace of mind to a security-conscious user of a computing device 102. In one implementation, a security engine 104 creates a tiny, hidden, and isolated data storage space 106, such as a MICROSOFT® .NET FRAMEWORK isolated storage space, within the larger data storage feature 108 of a convenient removable medium, such as a standard removable drive 110 as shown in FIG. 1a, or a flash card in a personal digital assistant "PDA" as shown in FIG. 1b. (Microsoft Corp., Redmond, Wash.) The removable drive 110 is capable of disconnecting from the memory of the computing device 102 via an interface 112, such as a universal serial bus (USB) port. The security engine 104 creates and/or stores an appropriately strong encryption key 114 in the isolated storage space 106. Once the files to be protected are encrypted, the computing device 102 "locks the door and throws the key away," that is, the encryption key 114 is wiped from the computing device 102 on which the encrypted data files reside and exists only in the isolated storage space 106 of the removable drive 110.

In one implementation, the encryption key 114 is irrevocably bound to the particular removable drive 110 on which it was created. That is, the isolated storage space 106 cannot so much as be accessed, except by the software code—e.g., the exemplary security engine 104—that created the isolated storage space 106. In another or the same implementation, a pirated copy of the encryption key 114 is still not able to decrypt files because, as mentioned above, the security engine 104 demands that the computing device 102, user, domain, removable drive 110, (and encryption key 114) all be the same as when the files were encrypted.

Once the encryption key 114 is created in the isolated storage space 106 on the removable drive 110, the removable drive 110 becomes an exemplary "physical encryption key" 116. If the removable drive 110 is removed from the computing device 102, then it is impossible to decrypt the encrypted files without reinserting the removable drive 110, as the encryption key 114 does not exist on the computing device 102. The only way to use or view encrypted files without the removable drive 110 being physically present in the computing device 102 or, without being the user who generated the physical encryption key 116 (but instead a user who possesses the physical encryption key 116 by accident or malice) is to use a "brute force" decryption scheme which, if 256 bit encryption is used for the encryption key 114, would take several hundred years to complete.

Thus, an exemplary physical encryption key 116 provides a measure of high security and peace of mind to the security-conscious user. The encrypted files cannot be decrypted without both the physical presence of the physical encryption key 116 and the credentials of the user who generated the physical encryption key 116. If the user knows that the physical encryption key 116 is in his immediate possession, then the user knows with a high degree of certainty that the encrypted files can never be opened without his consent, and is also assured that the physical encryption key 116 will not work without the user's own credentials. Moreover, in one implementation, decryption cannot take place on a different computing device, for example, in the event that private information encrypted by the physical encryption key 116 is copied, transferred, stolen, or intercepted by friendly or malicious processes.

Thus, as a user might rely on a physical key to start a car or open a door to a home, the user can also employ a physical encryption key 116 to protect personal secured files. But unlike a house key, the physical encryption key 116 cannot be copied, and will not work except for the true owner.

Exemplary Security Engine 104

Figure 2:
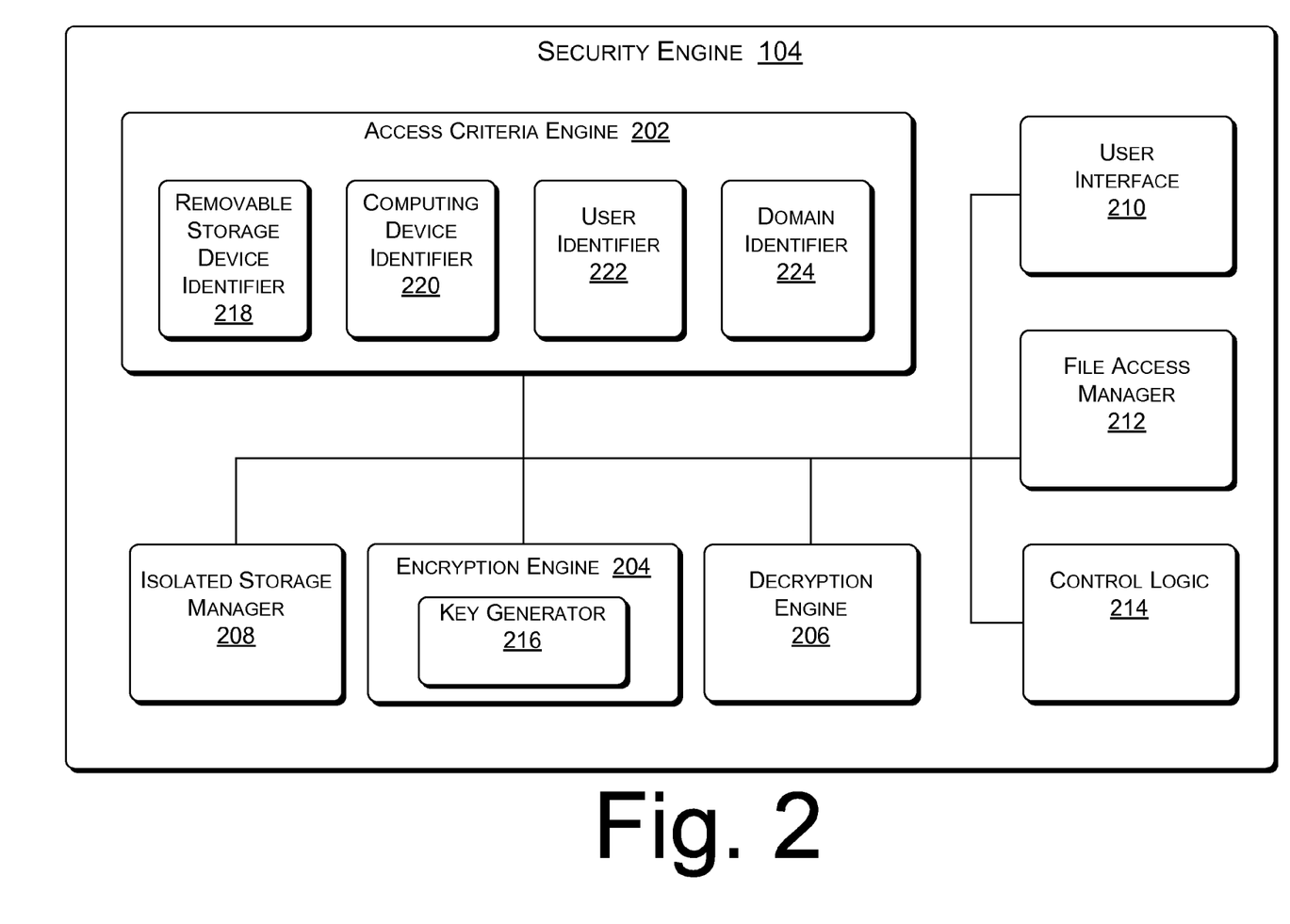
FIG. 2 is a block diagram of the exemplary security engine of FIGS. 1a and 1b in greater detail.

FIG. 2 shows the exemplary security engine 104 of FIGS. 1a and 1b in greater detail. The exemplary security engine 104 may be implemented in hardware, software, or combinations of hardware and software. In one implementation, the exemplary security engine 104 may further include the following components: an access criteria engine 202 to allow or refuse decryption of secured information; an encryption engine 204 to secure the information; a decryption engine 206 to decipher secured information for a user who possesses the proper credentials as well as the physical encryption key 116; an isolated storage manager 208 to create and access an isolated storage area on a removable drive 110; a user interface 210 to administer input and output to the user; and a file access manager 212 to provide filing services for information to be encrypted and decrypted by the exemplary security engine 104. Each of these components is communicatively coupled as illustrated to each other and to control logic 214.

The access criteria engine 202 may further include a removable storage device identifier 218, a computing device identifier 220, a user identifier 222, and a domain identifier 224. The access criteria engine 202 serves as an access controller to limit access to the encryption key 114 if access conditions are not met. Features of a .NET FRAMEWORK may be adopted to perform some functions of the access criteria engine 202.

The encryption engine 204 may further include a key generator 216, which may utilize a conventional key generation algorithm to generate, e.g., a 256 bit encryption key. Stronger encryption keys provide stronger security in the case of a brute force attempt to decrypt the secured information.

Upon the request of a user, via the user interface 210, for encryption services, the file access manager 212 of the security engine 104 identifies a computer file or other information to be encrypted. The components of the access criteria engine 202 may associate the file with a computing device 102, a currently logged on user of the computing device 102, a current computing domain of the user, a removable storage device 110 currently coupled to the computing device 102, and an encryption key datum, usually an encryption key 114 obtained from the key generator 216. The control logic 214, via the user interface 210, may prompt the user to insert the removable drive 110 into the relevant port 112.

The isolated storage manager 208 of the exemplary security engine 104 creates a small isolated storage space 106 on the identified removable drive 110. In one implementation, a .NET FRAMEWORK isolated storage space is created on the removable drive 110 selected to become the physical encryption key 116. The data size of the created isolated storage space may be small—for example, around 256 bits plus administrative overhead for a 256 bit encryption key 114—so that the isolated storage space 106 goes undetected by many operating system and system information processes, thus enhancing security. In a .NET FRAMEWORK implementation of an isolated storage space 106, loading an encryption key 114 into the isolated storage space 106 hides the encryption key 114 even from the owner of the physical encryption key 116. Since the isolated storage space 106 created on a physical encryption key 116 is not visible to anyone, not even the user who created it, it is very difficult for an unintended person to "steal" the encryption key 114 or discover its value even if they gain access to the physical encryption key 116.

In one version of the .NET FRAMEWORK, two types of isolation can be used: isolation by user and assembly; and isolation by user, domain, and assembly. Both types of isolation require that the storage area be associated with a user and assembly. Only the user and assembly that created the storage have access to it. An assembly is the primary building block of a .NET FRAMEWORK application. It is a collection of functionality that is built, versioned, and deployed as a single implementation unit containing one or more files.

If isolation is by user and assembly, then information stored in a .NET isolated storage space 106 can be accessed by multiple applications with appropriate levels of trust. But if isolation is by user, domain, and assembly, then only the code that created the isolated storage space 106 can have access to it, for example, only an assembly run from just one application, e.g., the isolated storage manager 208 of the exemplary security engine 104 can access it. No other application has access to the isolated storage space 106. This provides extra security, as only the exemplary security engine 104 may access the isolated storage space 106 for any purpose.

In one implementation, elements built into the .NET FRAMEWORK may automatically perform the functions of the removable storage device identifier 218, the computing device identifier 220, the user identifier 222, and the domain identifier 224. That is, in a .NET implementation, the components of an access criteria engine 202 may not have to be discrete, as their function may be built into the .NET fabric. Thus, in a .NET context, decryption may simply not work unless the proper assembly is active, which implies the presence and activity of the identical removable drive 110, computing device 102, user, domain, and encryption key 114 as were present when the secured information was encrypted.

Once the isolated storage space 106 exists on the removable drive 110, then the exemplary security engine 104 can load the encryption key 114 or other encryption datum into the isolated storage space 106. In one implementation, the encryption key 114 is never recorded on a permanent storage medium in the computing device 102, but exists on the computing device 102 only in volatile memory as needed to encrypt and decrypt secured information.

After the encryption key 114 is stored in the isolated storage space 106, then the encryption engine 204 may encrypt information designated by the user. The encrypted information may be stored on the computing device 102 or on other media in a conventional manner, however, they can only be decrypted on the same computing device 102 or other system on which they were encrypted.

After being used, the encryption key 114 may be wiped from volatile memory (532) of the computing device 102. A computing device 102 suitable for practicing the subject matter is shown in greater detail in FIG. 5.

In response to a request for decryption via the user interface 210, an exemplary security engine 104 checks for a proper level of trust to be present before decrypting requested information. Thus, the access criteria engine 202 may verify that the same user and domain are active as when the information was decrypted, including the same computing device 102 and removable drive 110. As mentioned above, these functions may be inherent if the implementation of the security engine 104 uses a .NET FRAMEWORK. If the removable drive 110 is not present, the control logic 214, via the user interface 210, prompts the user to insert the removable drive 110 into the relevant port 112.

When the properly credentialed user inserts the physical encryption key 116, then the decryption engine 206 decrypts the requested information. If the physical encryption key 116 is not present or the wrong user is logged on, then as discussed above, the requested information will not and cannot be decrypted.

An exemplary physical decryption key 116 generated by an exemplary security engine 104 can allow a user to completely control who has access to any information on a computing or a computing device 102. This can allow, for example, a parent to control children's access to an Internet web browser.

Exemplary Method 300

Figure 3:
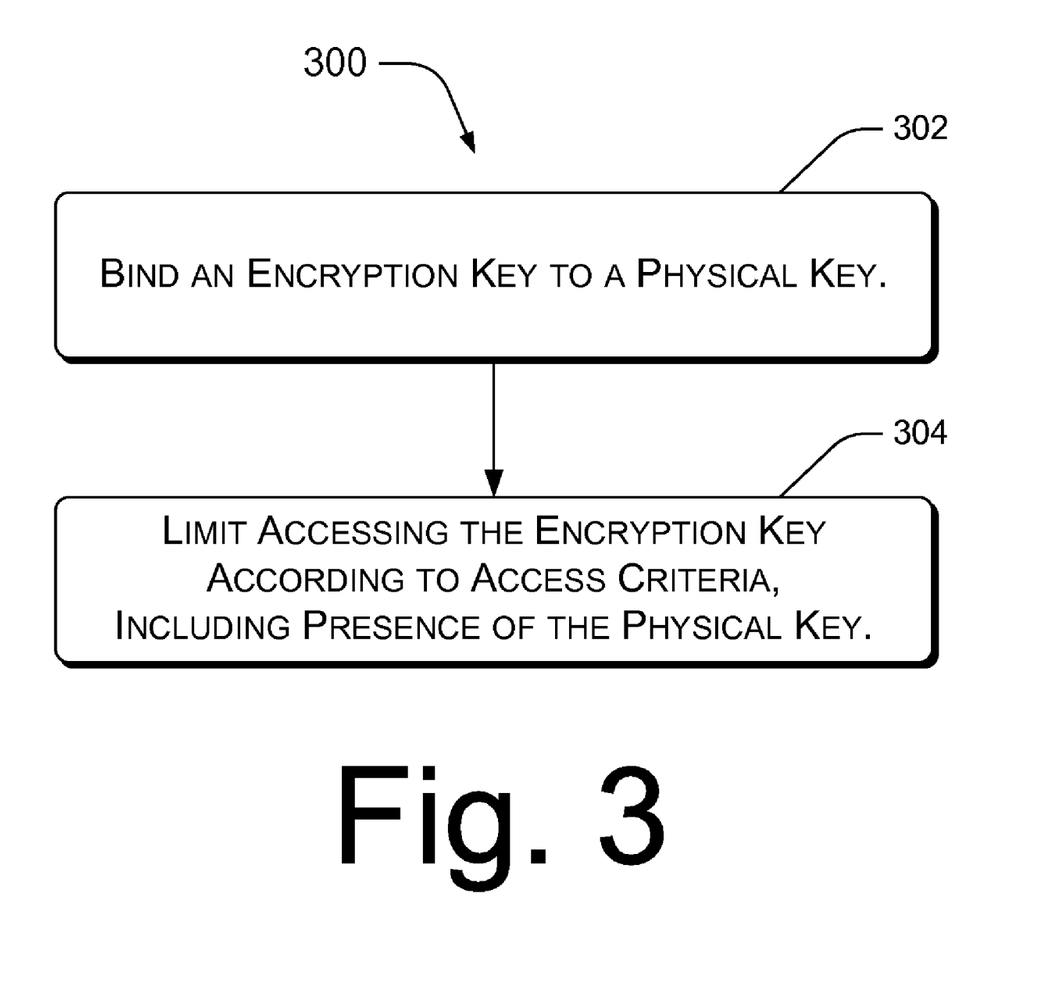
FIG. 3 is a flow diagram of an exemplary method of securing information using a physical encryption key.

FIG. 3 shows an exemplary method 300 of securing information using a physical encryption key. In the flow diagram, the operations are summarized in individual blocks. The operations may be performed in hardware and/or as machine-readable instructions (software or firmware) that can be executed by an exemplary security engine 104.

At block 302, an encryption key 114 is bound to a physical encryption key 116. In one implementation, a security engine 104 creates a .NET isolated storage space 106 on a convenient portable removable drive 110. An encryption engine 204 generates an encryption key 114; the .NET framework in this implementation exposes a key storage API (application program interface); and then the encryption key 114 is loaded into the isolated storage space 106 by an isolated storage manager 208.

The encryption key 114 is considered bound to the physical encryption key 116, e.g., the removable drive 110, because only the process that created the isolated storage space 106 can access it. It is difficult or impossible for another user or process to detect the presence of the .NET isolated storage space 106 and its contents or likewise, to access the encryption key 114. The encryption key 114 is considered irrevocably and exclusively bound to the physical encryption key 116.

At block 304, in one implementation, access to the encryption key is limited to the owner of the physical key on condition that the physical key is present, the owner submits credentials, and the owner is using the same computing device 102 (or system), the same domain, and the same application program that bound the encryption key 114 to the physical encryption key 116 at block 302. An access criteria engine 202 may include components to verify that these conditions have been met. Alternatively, as described above, a .NET FRAMEWORK may include functional elements that integrate the verification of the access criteria, that is, the .NET fabric may automatically include fulfillment of some or all of the conditions.

Exemplary Control Logic 214

Figure 4:
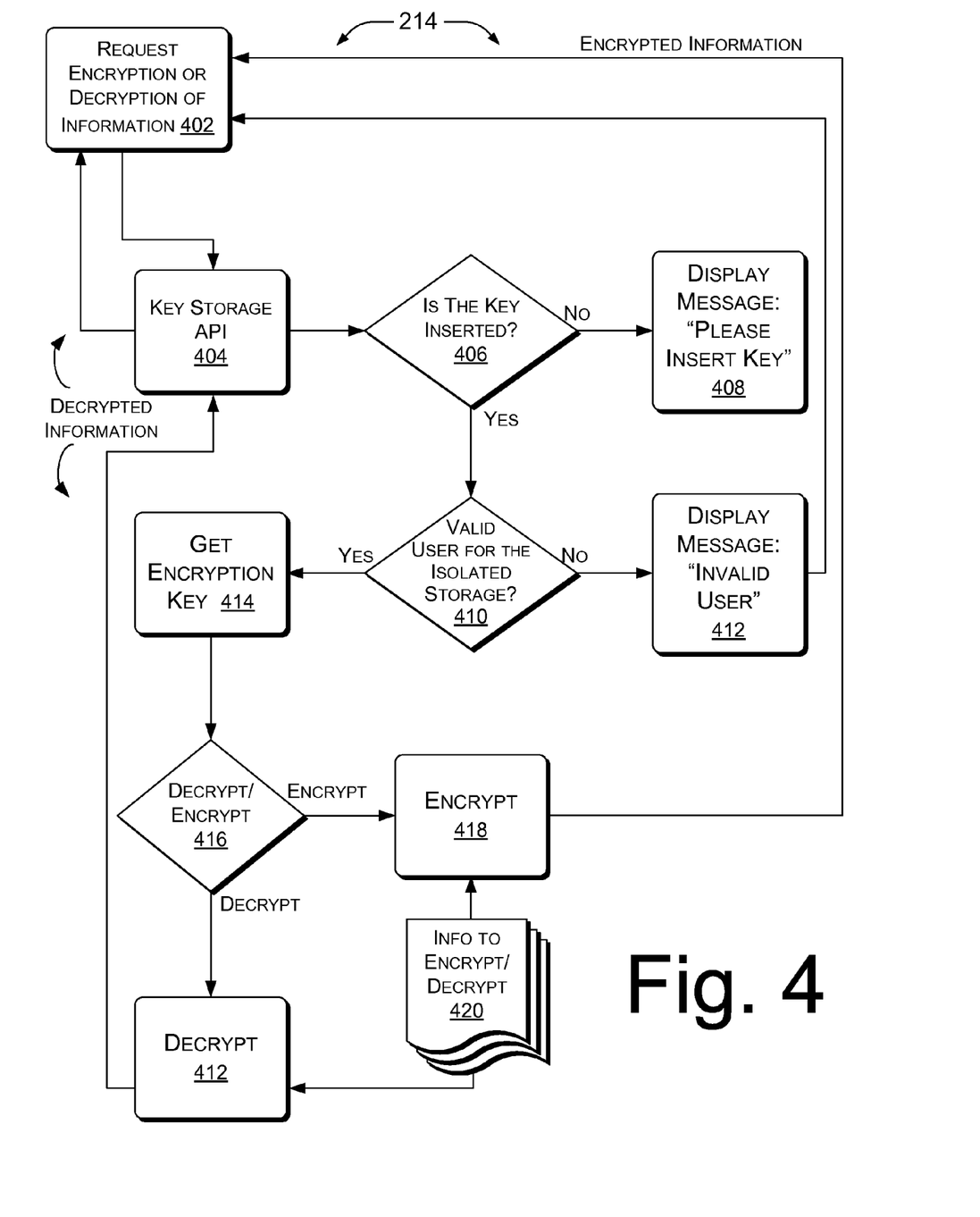
FIG. 4 is a flow diagram of exemplary control logic of an exemplary security engine.

FIG. 4 shows exemplary control logic 214 that may be used in some implementations, e.g., in an exemplary security engine 104. In the flow diagram for this example implementation, the operations and components are summarized in individual blocks. Operations may be performed in hardware and/or as machine-readable instructions (software or firmware) that can be executed by the exemplary security engine 104.

At block 402, an entity or process requests encryption or decryption of information. At block 404, a key storage API receives the request made at block 402. Then, at block 406, the control logic 214 checks if the physical encryption key 116 is coupled with the entity or process that performs the encrypting (or decrypting).

At block 408, if the physical encryption key 116 is not coupled, a user interface 210 displays a prompt for the user to insert the key into the relevant computing device 102. But at block 410, if the physical encryption key 116 was coupled at block 406, then the control logic 214 checks to see that a valid user is logged on for accessing the isolated storage space 106.

At block 412, if a valid user is not logged on, then a user interface 210 displays an invalid user message and returns the flow to requesting process at block 402. But at block 414, if a valid user is logged on, then the control logic 214 retrieves the encryption key 114 from the isolated storage space 106 of the coupled physical encryption key 116.

At block 416, the relevant encryption or decryption process is performed using the retrieved encryption key 114: at block 418, if encryption is to occur, unencrypted information 420 is identified and retrieved, encrypted, and transmitted to the requesting process at block 402. At block 422, if decryption is to occur encrypted information 420 is identified and retrieved, decrypted, the decrypted information is returned to the key storage API, at block 404, for transmittal to the requesting process at block 402.

Exemplary Computing Device 102

Figure 5:
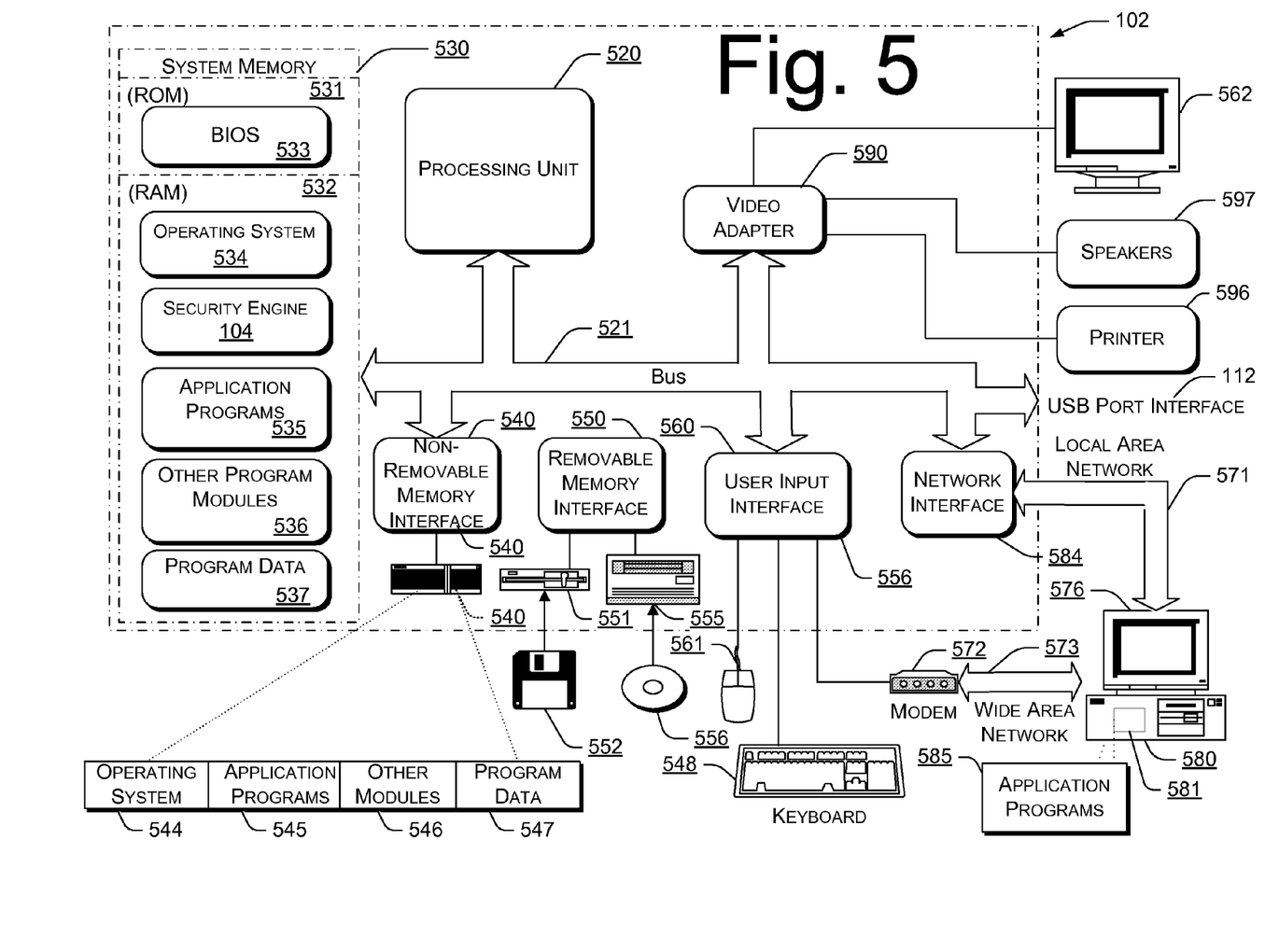
FIG. 5 is a block diagram of an exemplary computing device suitable for practicing the subject matter.

FIG. 5 shows an exemplary computing device 102 suitable as an environment for practicing aspects of the subject matter, for example to host an exemplary security engine 104. The components of computing device 102 may include, but are not limited to, a processing unit 520, a system memory 530, and a system bus 521 that couples various system components including the system memory 530 to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computing device 102 typically includes a variety of computing device-readable media. Computing device-readable media can be any available media that can be accessed by computing device 102 and includes both volatile and nonvolatile media, removable and non-removable media. By way of example, and not limitation, computing device-readable media may comprise computing device storage media and communication media. Computing device storage media include volatile and nonvolatile, removable and non-removable media implemented in any method or technology for storage of information such as computing device-readable instructions, data structures, program modules, or other data. Computing device storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 102. Communication media typically embodies computing device-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 530 includes computing device storage media in the form of volatile and/or nonvolatile memory such as read only memory (ROM) 531 and random access memory (RAM) 532. A basic input/output system 533 (BIOS), containing the basic routines that help to transfer information between elements within computing device 102, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537. Although the exemplary security engine 104 is depicted as software in random access memory 532, other implementations of an exemplary security engine 104 can be hardware or combinations of software and hardware.

The exemplary computing device 102 may also include other removable/non-removable, volatile/nonvolatile computing device storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface such as interface 550.

The drives and their associated computing device storage media discussed above and illustrated in FIG. 5 provide storage of computing device-readable instructions, data structures, program modules, and other data for computing device 102. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the exemplary computing device 102 through input devices such as a keyboard 548 and pointing device 561, commonly referred to as a mouse, trackball, or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port, or a universal serial bus (USB). A monitor 562 or other type of display device is also connected to the system bus 521 via an interface, such as a video interface 590. In addition to the monitor 562, computing devices may also include other peripheral output devices such as speakers 597 and printer 596, which may be connected through an output peripheral interface 595.

The exemplary computing device 102 may operate in a networked environment using logical connections to one or more remote computing devices, such as a remote computing device 580. The remote computing device 580 may be a personal computing device, a server, a router, a network PC, a peer device or other common network node, and typically includes many or all of the elements described above relative to computing device 102, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computing device networks, intranets, and the Internet.

When used in a LAN networking environment, the exemplary computing device 102 is connected to the LAN 571 through a network interface or adapter 570. When used in a WAN networking environment, the exemplary computing device 102 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the exemplary computing device 102, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computing devices may be used.

CONCLUSION

The subject matter described above can be implemented as logic modules, methods, hardware, software, and various combinations of each of these. In certain implementations, the subject matter may be described at least in part in the general context of computer-executable instructions, such as program modules, being executed by a computing device or communications device. Generally, program modules include routines, programs, objects, components, data structures, etc. that perform particular tasks or implement particular abstract data types.

The foregoing discussion describes an exemplary physical encryption key system. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for securing information, the method comprising:
   creating, via a process executing on a security engine of a specific computing device, an isolated storage space on a removable drive of the specific computing device, the removable drive including an administrative space and an encryption key space;
   storing credentials and a current computing domain of a user to the administrative space;
   generating the encryption key via the security engine;
   storing, via the security engine, an encryption key to the encryption key space;
   encrypting, via the security engine, information using the encryption key;
   receiving a request to decrypt the information from a decryption requesting entity executing a decryption requesting process;
   decrypting the information when the removable drive is connected to the specific computer device, the decryption requesting process is the same as the process executing on the security engine, the credentials are verified, and the user is in the current computing domain.

2. A method comprising:
   associating information to be secured by encryption with:
      a local computing device,
      a currently logged on user of the local computing device,
      a current computing domain of the user,
      a removable storage device currently coupled to the local computing device, and
      an encryption key datum;
   creating, via a process executing on a security engine of the local computing device, an isolated storage space on the removable storage device of the local computing device;
   encrypting the information to be secured;
   loading the encryption key datum into the isolated storage space via the security engine of the local computing device;
   requesting to decrypt the information from a decryption requesting entity executing a decryption requesting process; and
   decrypting the information using the encryption key datum when the removable storage device is coupled with the local computing device, the decryption requesting process is the same as the process executing on the security engine, credentials of the user are verified, and the user is in the current computing domain.

3. The method as recited in claim 2, wherein the isolated storage space is associated with a framework comprising a runtime engine.

4. The method as recited in claim 2, wherein the removable storage device comprises a universal serial bus storage device.

5. The method as recited in claim 2, wherein the removable storage device comprises a removable memory module.

6. The method as recited in claim 2, wherein the removable storage device comprises a compact flash card.

7. The method as recited in claim 4, wherein the universal serial bus storage device is a pen drive.

8. The method as recited in claim 2, further comprising prompting the user to couple the removable storage device with the local computing device before loading the encryption key datum onto the removable storage device.

9. The method as recited in claim 2, wherein the encrypting the information encrypts the information via the security engine of the local computing device.

10. The method as recited in claim 9, further comprising, in response to an attempt to access the information, prompting the user to couple the removable storage device with the local computing device.

11. A system, comprising:
   a processor; and
   processor-readable code executable by the processor to cause the processor to perform:
      creating, via a process executing on a security engine of a specific computing device, an isolated storage space on a removable drive of the specific computing device, the removable drive including an administrative space and an encryption key space;
      storing credentials and a current computing domain of a user to the administrative space;
      generating, via a security engine of the specific computing device, an encryption key;
      storing, via the security engine, the encryption key to the encryption key space;
      encrypting an information via the encryption key, wherein the security engine that generated the encryption key and stored the encryption key also encrypts the information;
      receiving a request to decrypt the information from a decryption requesting entity executing a decryption requesting process; and
      decrypting the information when the removable drive is connected to the specific computer device, the decryption requesting process is the same as the process executing on the security engine, the credentials are verified, and the user is in the current computing domain.

12. A processor-accessible storage medium comprising processor-executable instructions that, when executed, direct a specific computing device to:
   generate an encryption key for encrypting or decrypting information, wherein a security engine of the specific computing device generates the encryption key;

create an isolated storage space on a physical key via a process executing on the security engine of the specific computing device;

load, via the security engine that generated the encryption key, the encryption key from the specific computing device into the isolated storage space;

encrypt the information via the security engine;

load credentials and a current computing domain for a user of the computing device from the specific computing device into the isolated storage space;

request to decrypt the information from a decryption requesting entity executing a decryption requesting process; and decrypt the information when the physical key is connected to the specific computer device, the decryption requesting process is the same as the process executing on the security engine, the credentials are verified, and the user is in the current computing domain.

13. A security engine of a specific computing device embodied on a computer readable storage media having computer-executable instructions, the securing engine comprising:

an access criteria engine of the security engine to: (1) allow decryption of secured information and (2) control access to an encryption key stored on an isolated storage area on a removable storage media drive of the specific computing device an encryption engine of the security engine to (1) generate an encryption key and (2) encrypt the secured information, the encryption key associated with the secured information;

a decryption engine to decipher the secured information for a user of the specific computing device who possesses correct credentials in a correct domain and a credible physical encryption key; and an isolated storage manager of the security engine of the specific computing device to create the isolated storage area on the removable storage media drive, wherein the security engine encrypts the secured information, generates the encryption key, deciphers the secured information, and creates the isolated storage area on the removable storage media drive.

* * * * *